(12) United States Patent
Yano et al.

(10) Patent No.: US 6,614,173 B2
(45) Date of Patent: Sep. 2, 2003

(54) FLUORESCENT THIN FILM, PREPARATION METHOD, AND EL PANEL

(75) Inventors: Yoshihiko Yano, Chuo-ku (JP); Tomoyuki Oike, Chuo-ku (JP)

(73) Assignee: TDK Corporation, Tokyo (JP)

(*) Notice: Subject to any disclaimer, the term of this patent is extended or adjusted under 35 U.S.C. 154(b) by 71 days.

(21) Appl. No.: 09/866,696

(22) Filed: May 30, 2001

(65) Prior Publication Data
US 2002/0006051 A1 Jan. 17, 2002

(30) Foreign Application Priority Data

Jul. 7, 2000 (JP) .......................... 2000-206652
Oct. 3, 2000 (JP) .......................... 2000-303719
May 11, 2001 (JP) .......................... 2001-142024

(51) Int. Cl.[7] .......................... H01J 1/62; H01J 63/04; C09K 11/08

(52) U.S. Cl. .......................... 313/503; 313/498; 313/502; 252/301.45; 252/301.65; 427/66

(58) Field of Search .......................... 252/301.45, 301.65; 427/66; 313/502, 503

(56) References Cited

U.S. PATENT DOCUMENTS

| | | | | |
|---|---|---|---|---|
| 5,505,986 A | * | 4/1996 | Velthaus et al. | 427/66 |
| 5,985,174 A | * | 11/1999 | Heo | 252/301.4 R |
| 6,074,575 A | * | 6/2000 | Sugioka et al. | 252/301.4 S |
| 6,117,362 A | * | 9/2000 | Yen et al. | 252/301.4 R |
| 6,180,029 B1 | * | 1/2001 | Hampden-Smith et al. | 252/301.4 R |

FOREIGN PATENT DOCUMENTS

| | | | | |
|---|---|---|---|---|
| JP | 8-134440 | | 5/1996 | |
| JP | 2840185 | | 10/1998 | |
| JP | 2001262140 A | * | 9/2001 | C09K/11/64 |

OTHER PUBLICATIONS

Isao Tanaka, et al., Composition and Optical Properties of Blue–Emitting $BaAl_2S_4:Eu^{2+}$ Electroluminescent Thin Films, NHK Science and Technical Research Laboratories, School of Science and Technology, MEIJI University, Japan Society for the Promotion of Science, Conference Held on May 26, 2000.

M. Kawanishi, et al., Technical Report of IEICE. EID98–113, pp. 19–24, "$CaAl_2S_4:Ce$ Thin Film El Devices Prepared By The Two Targets Pulse Electron–Beam Evaporation", Jan. 1999 (with partial English translation).

N. Miura, et al., Jpn. J. Appl. Phys., vol. 38, Part 2, No. 11B, pp. L1291–L1292, "High–Luminance Blue–Emitting $BaAl_2S_4:Eu$ Thin–Film Electroluminescent Devices", 1999.

I. Tanaka, et al., The 22nd Seminar Data Photoelectric Inter–Conversion the 125th Commision EL Department, pp. 16–21, "Composition and Optical Properties of Blue–Emitting $BaAl_2S_4:Eu^{2+}$ Electroluminescent Thin Films", May 26, 2000. (with English concise explanation).

(List continued on next page.)

*Primary Examiner*—Ashok Patel
*Assistant Examiner*—German Colón
(74) *Attorney, Agent, or Firm*—Oblon, Spivak, McClelland, Maier & Neustadt, P.C.

(57) ABSTRACT

The invention has for its object to provide a phosphor thin film which can dispense with any filter and has satisfactory color purity, is particularly well fit for RGB full-color Els, and simplifies a full-color EL panel production process, thereby providing a phosphor thin film which is less susceptible to luminance variations and can be produced in improved yields and so at lower costs and its fabrication process as well as an EL panel. This is achieved by the provision of a phosphor thin film comprising a matrix material containing as a main component an alkali earth aluminate that is an oxide, with sulfur added to the matrix material, and further containing an element that provides a luminescentce center.

12 Claims, 6 Drawing Sheets

OTHER PUBLICATIONS

S. Oshio, et al., Display and Imaging, vol. 3, No. 2, pp. 181–187, "Novel Electroluminescent Thin Films: Thiogallate–Type Phosphos", 1994. (with English concise explanation).

P.C. Donohue, et al., J. Electrochem. Soc. vol. 121, No. 1, pp. 137–141, "The Synthesis and Photoluminescence of $M^{11}M_2^{111}(S,Se)_4$", Jan. 1974.

P. Benalloul, et al., Appl. Phys. Lett., vol. 63, No. 14, pp. 1954–1956, "IIA–III$_2$–S$_4$ Ternary Compounds: New Host Matrices For Full Color Thin Film Electroluminescence Displays", Oct. 4, 1993.

K. T. Le Thi, et al., Materials Science and Engineering, B14, pp. 393,397, "Investigation of the MS–Al$_2$S$_3$ Systems (M#Ca, Sr, Ba) and Luminescence Properties of Europium–Doped Thioaluminates", 1992.

* cited by examiner

FLUORESCENT THIN FILM, PREPARATION METHOD, AND EL PANEL

BACKGROUND OF THE INVENTION

1. Field of the Invention

The present invention relates generally to an oxide light emitting layer used for organic electroluminescent (EL) devices, and more particularly to a phosphor thin film used for a light emitting layer and an EL panel using the same.

2. Background Art

In recent years, thin-film EL devices have been increasingly studied for compact or large yet lightweight flat displays. A monochromatic thin-film EL display using a phosphor thin film comprising manganese-added zinc sulfide for yellowish orange light emission has already been practically used in the form of a double-insulating structure using thin-film insulating layers 2 and 4 as shown in FIG. 2. Referring to FIG. 2, a lower electrode 5 is formed in a given pattern on a substrate 1, and a first insulating layer 2 is formed on the lower electrode 5. On the first insulating layer 2, there are provided a light emitting layer 3 and a second insulating layer 4 in this order. An upper electrode 6 is formed on the second insulating layer 4 in such a given pattern as to form a matrix circuit with the lower electrode 5.

To accommodate well to personal computer displays, TV displays and other displays, color displays are absolutely needed. Thin-film EL displays using a sulfide fluorescent material thin film are excellent in reliability and resistance to environmental conditions. At present, however, they are thought of as being unsuitable for color display purposes, because the properties of an EL fluorescent material for emitting the three primary colors or red, green and blue are less than satisfactory. Candidates for a blue emitting fluorescent substance are SrS:Ce where SrS is used as a matrix material and Ce as a luminescent center and ZnS:Tm, candidates for a red emitting fluorescent substance are ZnS:Sm and CaS:Eu, and candidates for a green emitting fluorescent substance are ZnS:Tb, CaS:Ce, etc, and studies thereof are now under way.

These fluorescent materials for emitting the three primary colors, viz., red, green and blue have problems in conjunction with light emission luminance, efficiency, color purity, etc., and so color EL panels are still on impractical levels. For blue in particular, relatively high luminance is obtained using SrS:Ce. However, such luminance is still unsatisfactory for blue applied to full-color displays, with chromaticity shifted to a green side. Thus, much improved blue emitting layers are in great demand.

To provide a solution to these problems, thiogallate or thioaluminate blue fluorescent substances such as $SrGa_2S_4$:Ce, $CaGa_2S_4$:Ce, and $BaAl_2S_4$:Eu have been developed, as set forth in JP-A's 07-122364 and 08-134440, Shingaku Giho EID98-113, pp. 19–24, and Jpn. J. Appl. Phys. Vol. 38, (1999), pp. L1291–1292. These thiogallate fluorescent substances offer no problem in connection with color purity, but have a low luminance problem. In particular, it is very difficult to obtain uniform thin films because such materials have a multiple composition. Poor crystallizability due to poor composition controllability, defects due to sulfur release, contamination with impurities, etc. appear to be leading factors for failures in obtaining thin films of high quality, and so resulting in no luminance increase. Thioaluminate in particular has great difficulty in composition controllability.

To achieve full-color EL panels, fluorescent materials capable of emitting blue, green and red light in a stable fashion and at low costs and their fabrication process are needed. However, phosphor thin films must be fabricated by separate processes depending on their type, because the chemical or physical properties of matrix materials for the phosphor thin films and luminescent center materials differ from material to material as mentioned above. For instance, with a film formation process capable of obtaining high luminance with one single material, it is impossible to increase the luminance of a phosphor thin film of other color. Given a full-color EL panel fabrication process, a plurality of different film formation systems are thus needed. As a result, the fabrication process increases in complexity, with an increasing panel fabrication cost.

The EL spectra of the aforesaid blue, green and red EL phosphor thin films are all broad. When they are used for a full-color EL panel, the RGB necessary for the panel must be cut out of the EL spectra of the EL phosphor thin films using separate filters. The use of such filters does not only make the fabrication process much more complicated, but also offer the gravest problem, viz., luminance drops. Extraction of RGB using filters causes practically unacceptable losses of 10 to 50% of the luminance of the blue, green and red EL phosphor thin films.

To provide a solution to the aforesaid problems, there is an increasing demand for red, green and blue fluorescent thin-film materials capable of emitting light at enhanced luminance yet with improved color purity as well as a fluorescent matrix material and a luminance center material which can ensure enhanced luminance using the same film formation method or system and are similar to each other in terms of chemical or physical properties.

SUMMARY OF THE INVENTION

One object of the present invention is to provide a phosphor thin film which can dispense with any filter and has satisfactory color purity, and is particularly well fit for RGB full-color ELs and its fabrication process as well as an EL panel.

Another object of the present invention is to simplify a full-color EL panel production process, thereby providing a phosphor thin film which is less susceptible to luminance variations and can be produced in improved yields and so at lower costs and its fabrication process as well as an EL panel.

Such objects are achievable by the following embodiments (1) to (11) of the invention.

(1) A phosphor thin film comprising a matrix material containing as a main component an alkali earth aluminate that is an oxide and containing sulfur, and further containing an element that provides a luminescent center.

(2) The phosphor thin film according to (1) above, which is represented by $$A_xAl_yO_zS_w:Re$$

where Re is a rare earth element, A is at least one element selected from Mg, Ca, Sr and Ba, x=1 to 5, y=1 to 15, z=3 to 30, and w=3 to 30.

(3) The phosphor thin film according to (1) above, wherein the molar ratio, S/(S+O), of the sulfur element contained therein with respect to an oxygen atom in said matrix material is in the range of 0.01 to 0.5.

(4) The phosphor thin film according to (2) above, wherein $1.5 \leq y/x \leq 3.0$.

(5) The phosphor thin film according to (4) above, wherein S/(S+O)=0.7 to 0.9.

(6) A phosphor thin film represented by $$A_xAl_yO_zS_w:Re$$

where Re is a rare earth element, A is at least one element selected from Mg, Ca, Sr and Ba, x=1 to 5, y=1 to 15, z=3 to 30, and w=3 to 30 provided that $5 \leq y/x \leq 7$.

(7) The phosphor thin film according to (1) above, wherein said luminescent center Re is any one of Eu, Tb and Sm.

(8) An electroluminescent panel comprising a phosphor thin film as recited in (1) above.

(9) A phosphor thin film fabrication process comprising steps of:
forming a sulfide thin film containing sulfur and a luminescent center for a matrix material precursor, and
annealing the sulfide thin film in an oxidizing atmosphere to introduce oxygen therein, thereby obtaining a phosphor thin film as recited in (1) above.

(10) A process for fabricating a phosphor thin film as recited in (1) above by an evaporation process, which comprises steps of:
introducing an oxygen gas in a vacuum chamber in which, at least, an aluminum sulfide evaporation source and an alkali earth sulfide evaporation source with a luminescent center added thereto are disposed, and
evaporating aluminum sulfide and an alkali earth sulfide material from the respective evaporation sources to combine the respective feed materials with the oxygen gas during the deposition thereof on a substrate, thereby obtaining said phosphor thin film.

(11) A process for fabricating a phosphor thin film as recited in (1) above by an evaporation process, which comprises steps of:
introducing a hydrogen sulfide gas in a vacuum chamber in which, at least, an aluminum sulfide evaporation source and an alkali earth sulfide evaporation source with a luminescent center added thereto are disposed,
evaporating aluminum sulfide and an alkali earth sulfide material from the respective evaporation sources,
combining the respective feed materials with the hydrogen sulfide gas during the deposition thereof on a substrate, thereby obtaining a sulfide phosphor thin film, and
annealing the sulfide phosphor thin film in an oxidizing atmosphere.

FUNCTION

Figure 1:
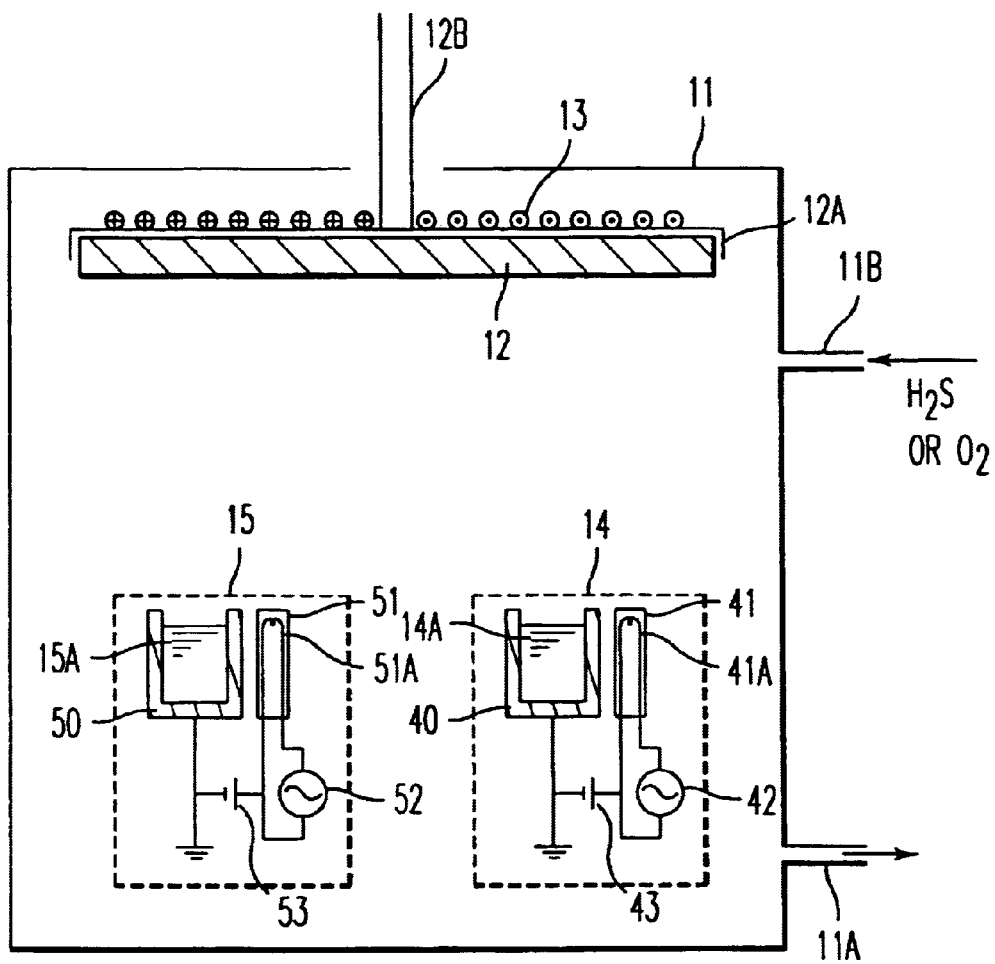
FIG. 1 is a sectional view in schematic form illustrative of one exemplary arrangement of the system to which the invention is applicable or the fabrication system of the invention.

The present invention is accomplished as a result of the synthesis of a compound material comprising a chemically or physically stable oxide, using a reactive evaporation process as the same film-formation technique. The obtained thin film is capable of radiation light in various colors over a wide range of red to blue.

The phosphor thin film of the present invention comprises as a matrix material an alkali earth aluminate that is an oxide. There have been no reported cases of application of alkali earth aluminate thin films to thin-film fluorescent materials for EL purposes, probably because the alkali earth aluminate could hardly be formed into any crystallized thin film and so not be used as phosphor thin film for EL light emission. The feasibility of the alkali earth aluminate in the form of PDPs and fluorescent lamps is now under study. For instance, a Ba material such as barium carbonate and an Al material such as alumina, with Eu added thereto, are fired at 1,100° C. to 1,400° C. for powder synthesis. The powders are used as a blue fluorescent material for PDPs or fluorescent lamps.

First of all, the inventors prepared barium aluminate in the form of a thin film for use as a phosphor thin film for EL purposes, and then used the obtained thin film to fabricate an EL device. However, any desired light emission could not be obtained. When the EL device was then annealed at 1,100° C., EL light emission was observed with some difficulty. This annealed device had a luminance as low as 2 cd/m²; however, ever-higher luminance and a reduction in the process temperature were still needed for the application of this EL device to panels.

In consideration of such results, the inventors have made thorough studies of phosphor thin films based on this system, and consequently accomplish the present invention. Thus, the inventors have found that dramatic luminance improvements can be achieved by the addition of sulfur to a barium aluminate matrix material.

PREFERRED EMBODIMENTS OF THE INVENTION

Some preferred embodiments of the present invention are now explained in detail.

The phosphor thin film of the invention comprises an alkali earth aluminate matrix material that is an oxide. The matrix material further contains sulfur, and a rare earth element is added thereto as a luminescent center.

The alkali earth aluminate used for the phosphor thin film of the present invention includes $A_5Al_2O_8$, $A_4Al_2O_7$, $A_2Al_2O_5$, $AAl_2O_4$, $AAl_4O_7$, $A_4Al_{14}O_{25}$, $AAl_8O_{13}$, and $AAl_{12}O_{19}$, wherein A is an alkali earth. The matrix material may be composed of one of these aluminate compounds or a mixture of two or more of them. Alternatively, the matrix material used may be in an amorphous state having no definite crystal structure.

Containing sulfur in the aforesaid matrix material, the phosphor thin film of the present invention should preferably be represented by the following composition formula:

$$A_xAl_yO_zS_w:Re$$

where Re is a rare earth element, and A is at least one element selected from Mg, Ca, Sr and Ba.

In this formula, x, y, z and w are indicative of the molar ratios of the elements A, Al, O and S, respectively. For x, y, z and w, it is preferable that x=1 to 5 y=1 to 15 z=3 to 30 w=3 to 30

The alkali earth aluminate matrix material should preferably contain sulfur in such a way that S/(S+O) is in the range of 0.01 to 0.95, and especially 0.01 to 0.5, where S/(S+O) is indicative of the atomic ratio of sulfur with respect to oxygen in the matrix material. To put it another way, the value of w/(z+w) in the aforesaid formula should be 0.01 to 0.5, preferably 0.02 to 0.3, and especially 0.03 to 0.15.

Of the elements represented by the capital letter A, Ba is most preferred. When the capital letter A is indicative of Ba, it is preferable that the atomic ratio between Ba and Al, Al/Ba, is in the range of 5 to 7.

Especially when the value of w/(z+w) in the aforesaid formula is 0.7 to 0.9 and preferably 0.75 to 0.85, it is then desired that the atomic ratio between the aforesaid element A and the element Al, Al/A, be in the range of 1 to 3, preferably 1.5 to 3.0, and especially 2.0 to 2.5.

Sulfur has an effect on dramatic improvements in the emission luminance of the phosphor thin film. One possible explanation for this could be that when sulfur is added to the alkali earth aluminate, the crystallization of the matrix material is accelerated during film formation or post treatments such as annealing after film formation, so that the added rare earth has an effective transition within a compound crystal field, resulting in the achievement of high-luminance light emission.

A light-emitting device has a certain life span during which the luminance deteriorates with the lapse of time. A composition with oxygen coexisting with sulfur contributes to long lasting qualities and prevention of deterioration in luminance. The matrix material, if mixed with a compound with oxygen, is kept more stable in the air, as compared with the case where the matrix material is in a pure sulfide state. This is believed to be because the stable oxide component protects the sulfide component in the film against the atmosphere. In other words, the inventors' studies show that the aforesaid optimum value is found in composition between the sulfide and the oxide.

The contents of sulfur and oxygen in the matrix material may be controlled by control of the starting compositions. Alternatively, such contents may be controlled by carrying out annealing after the formation of the thin film under controlled conditions.

For the element Re contained as the luminescent center, one or two or more elements selected from transition metal elements such as Mn and Cu, rare earth metal elements, Pb, and Bi may be used. The rare earth is selected from at least the group consisting of Sc, Y, La, Ce, Pr, Nd, Gd, Tb, Ho, Er, Tm, Lu, Sm, Eu, Dy and Yb. However, it is preferable that Eu is used for a blue fluorescent material; Ce, Tb, and Ho as a green fluorescent material; and Sm, Yb, and Nd as a red fluorescent material. In consideration of combinations with the matrix material, Eu, Tb, and Sm is preferable, with Eu being most preferred. The amount of the element Re added should preferably be 0.5 to 10 at % with respect to the alkali earth atom.

It is preferable that this phosphor thin film is obtained typically by such a reactive evaporation process as explained below. The reactive evaporation process is now explained while taking a barium aluminate:Eu phosphor thin film as an example.

A barium aluminate pellet with Eu added thereto is first prepared. Then, this pellet is subjected to EB evaporation in a vacumm chamber with $H_2S$ gas introduced therein. Herein the $H_2S$ gas is used for the addition of sulfur.

Besides, the phosphor thin film may be fabricated by the following multi-reactive evaporation processes.

For instance, preference is given to a binary reactive evaporation process using a barium oxide pellet with Eu added thereto, an alumina pellet and $H_2S$ gas, a binary vacuum evaporation process wherein a barium sulfide pellet with Eu added thereto is used with an alumina pellet in the absence of any gas, a binary vacuum evaporation process wherein a barium oxide pellet with Eu added thereto is used with an aluminum sulfide pellet in the absence of any gas, and a binary reactive evaporation process using a barium sulfide pellet with Eu added thereto, an aluminum sulfide pellet and $O_2$ gas.

In particular, it is preferable to make use of a phosphor thin film fabrication process comprising the steps of:

introducing an oxygen gas ($O_2$) in a vacuum chamber in which, at least, an aluminum sulfide evaporation source and an alkali earth sulfide evaporation source with a luminescent center added thereto are disposed, and evaporating aluminum sulfide and an alkali earth sulfide material from the respective evaporation sources to combine the respective feed materials with the oxygen gas during the deposition thereof on a substrate, thereby obtaining said phosphor thin film.

It is also preferable to make use of a process combined with annealing, viz., a process wherein a barium thioaluminate thin film is annealed in an oxidizing atmosphere such as oxygen or air. For instance, a thin film obtained typically by the binary reactive evaporation process using a barium sulfide pellet with Eu added thereto, an aluminum sulfide pellet and hydrogen sulfide ($H_2S$) gas is annealed in the air. Annealing is preferably carried out in an oxidizing atmosphere with the concentration of oxygen equal to or higher than that in the atmosphere and at a temperature in the range of preferably 500° C. to 1,000° C., and especially 600° C. to 800° C.

Also, it is particularly preferable to make use of a phosphor thin film fabrication process comprising the steps of:

introducing a hydrogen sulfide gas in a vacuum chamber in which, at least, an aluminum sulfide evaporation source and an alkali earth sulfide evaporation source with a luminescent center added thereto are disposed, and evaporating aluminum sulfide and an alkali earth sulfide material from the respective evaporation sources, combining the respective feed materials with the hydrogen sulfide gas during the deposition thereof on a substrate, thereby obtaining a sulfide phosphor thin film, and annealing the sulfide phosphor thin film in an oxidizing atmosphere.

The Eu to be added is given to the starting material in the form of a metal, fluoride, oxide or sulfide, and the amount of Eu varies with the starting material and the formed thin film. Accordingly, it is preferable to determine an appropriate amount of Eu by control of the starting material composition.

During the evaporation process, the substrate is preferably maintained at a temperature of room temperature to 600° C., and especially 100° C. to 300° C. Too high a substrate temperature causes the thin film of the matrix material to have rough surface asperities, offering problems such as pinholes in the thin film and current leakage from an EL device. In addition, the thin film is colored in brown. For these reasons, the aforesaid temperature range is preferred.

The thus formed oxide phosphor thin film should preferably have high crystallographic properties. The crystallographic properties may be evaluated typically by X-ray diffraction. To enhance the crystallographic properties, it is preferable to keep the substrate at as high a temperature as possible. This may also be effectively achieved by annealing the obtained thin film in a vacuum, $N_2$, Ar, S vapor, $H_2S$, air, oxygen or the like.

While the thickness of the light emitting layer is not critical, it is appreciated that too large a thickness results in a driving voltage increase whereas too small a thickness leads to a drop of light emission efficiency. To be more specific, the light emitting layer has a thickness of about 100 to 2,000 nm, and especially about 150 to 700 nm, although varying with the fluorescent material used.

The pressure for evaporation should preferably be $1.33 \times 10^{-4}$ to $1.33 \times 10^{-1}$ Pa ($1 \times 10^{-6}$ to $1 \times 10^{-3}$ Torr). In particular, both the $H_2S$ gas for the addition of sulfur and the oxygen gas for the acceleration of oxidization should be introduced at a controlled pressure of $6.65 \times 10^{-3}$ to $6.65 \times 10^{-2}$ Pa ($5 \times 10^{-5}$ to $5 \times 10^{-4}$ Torr). At a pressure higher than this, it is very difficult to achieve composition control due to the unstable operation of an E gun. The amount of the $H_2S$ gas or oxygen gas introduced should preferably be 5 to 200 SCCM, and especially 10 to 30 SCCM although depending on the capacity of the vacuum system.

If required, it is acceptable to move or rotate the substrate during evaporation. By moving or rotating the substrate, it is possible to obtain a thin film having uniform composition with a reduced variation in the thickness distribution thereof.

The substrate may be rotated at preferably at least 10 rpm, more preferably 10 to 50 rpm, and even more preferably about 10 to 30 rpm. When the revolutions per minute of the substrate are too large, problems tend to arise in connection with sealability upon the introduction of the substrate in the vacuum chamber. When the revolutions per minute is too small, composition variations occur in the thickness direction in the vacuum chamber with the result that the properties of the formed light emitting layer drop. Means for rotating the substrate may be built up of known rotational systems using a power source comprising a motor, a hydraulic rotational mechanism, etc. and a power transmission and reduction mechanism comprising a combination of gears, belts, pulleys, etc.

Any desired heating means for heating the evaporation sources or the substrate may be used provided that it has the predetermined heat capacity and reactivity, etc. For instance, tantalum wire heaters, sheathed heaters, and carbon heaters may be used. The evaporation sources or the substrate should be heated to a temperature of preferably about 100 to 1,400° C. using the heating means, with a temperature control precision of about ±1° C., and preferably about +0.5° C. at 1,000° C.

One exemplary arrangement of the system for forming the light emitting layer according to the present invention is shown in FIG. 1. Herein, how to fabricate an S-added barium aluminate:Eu while aluminum sulfide and barium sulfide are used as evaporation sources with the introduction of oxygen is taken as an example. Referring to FIG. 1, within a vacuum chamber 11 there are disposed a substrate 12 on which the light emitting layer is to be formed, and EB evaporation sources 14 and 15.

The EB (electron beam) evaporation sources 14 and 15 defining the evaporation means for aluminum sulfide and barium sulfide comprise crucibles 40 and 50, in which barium sulfide 14a with a luminescent center added thereto and aluminum sulfide 15a are received, respectively, and electron guns 41 and 51 with built-in filaments 41a and 51a for ejecting electrons. The electron guns 41 and 51 have each a built-in mechanism for beam control. The electron guns 41 and 51 are connected with alternating power sources 42 and 52 and bias power sources 43 and 53, respectively. The electron guns 41 and 52 eject electron beams in such a controlled manner that the barium sulfide 14a with the luminescent center added thereto and aluminum sulfide 15a can be alternately evaporated at the predetermined rate with the predetermined power. An evaporation process designed to perform multiple co-evaporation with one E gun is called a multiple pulse evaporation process.

The vacuum chamber 11 includes an evacuation port 11a, through which the vacuum chamber 11 is evacuated to a given degree of vacuum. This vacuum chamber 11 has also a feed gas feed portion 11b through which the oxygen gas or hydrogen sulfide gas is introduced.

The substrate 12 is fixed to a substrate holder 12a, and the shaft 12b of the holder 12a is held in place by means of a fixing means (not illustrated) in such a manner that it is rotatable by means of an external rotating means while the given degree of vacuum within the vacuum chamber 11 is kept. This shaft 12b is then rotatable at a given rpm, if required, by means of the rotating means (not shown). A heating means 13 built up of a heater wire or the like is fixed to the substrate holder 12a in close contact relation thereto, so that the substrate can be heated to the desired temperature and held at that temperature.

In such a system, vapors of barium sulfide and aluminum sulfide evaporated from the EB evaporation sources 14 and 15 are deposited onto the substrate and combined with the oxygen introduced, so that an S-added oxide fluorescent layer is formed thereon. If, in this case, the substrate 12 is rotated as occasion demands, it is then possible to make the composition, and thickness distribution of the deposited light emitting layer more uniform. While this embodiment is explained with reference to the case where two EB evaporation sources are used, it is appreciated that the evaporation sources are not limited to the EB evaporation sources; other evaporation sources such as resistive heating evaporation sources may be used depending on the materials and conditions applied.

According to the inventive phosphor thin film material and the inventive phosphor thin film fabrication process by evaporation, it is possible to easily form a phosphor thin film capable of emitting light with an ever-higher luminance, as already mentioned.

Figure 2:
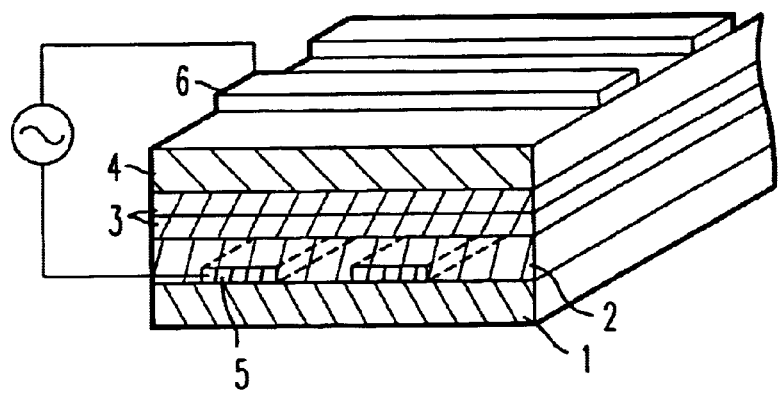
FIG. 2 is a partly sectioned view illustrative of one exemplary arrangement of an inorganic EL device that may be fabricated by the process and system of the invention.

With the light emitting layer 3 of the present invention, an inorganic EL device having such structure as shown in FIG. 2 may be obtained. Between adjacent layers in the arrangement comprising a substrate 1, electrodes 5, 6, a thick-film insulating layer 2 and a thin-film insulating layer 4, intermediate layers such as a contact improving layer, a stress relaxing layer and a reaction preventing layer may be interposed. The surface flatness of the thick film may be enhanced by polishing the surface thereof or using a flattening layer.

FIG. 2 is a partly sectioned perspective view illustrating of the structure of an inorganic EL device constructed using the inventive light emitting layer. Referring to FIG. 2, a lower electrode 5 is formed in a given pattern on a substrate 1, and a thick-film form of first insulating layer (thick-film dielectric layer) 2 is formed on the lower electrode 5. The first insulating layer 2 is provided thereon with a light emitting layer 3 and a second insulating layer (thin-film dielectric layer) 4 in this order, and an upper electrode 6 is formed on the second insulating layer 4 in such a pattern that it forms a matrix circuit with the aforesaid lower electrode 5.

No particular limitation is imposed on the material to form the substrate, if it can stand up to the thick-film formation temperature, EL fluorescent layer formation temperature and EL device annealing temperature, viz., it can have a heat resistant temperature or melting temperature of 600° C. or higher, preferably 700° C. or higher, and more preferably 800° C. or higher, allows an EL device to be formed thereon using a functional thin film such as a light emitting layer, and can maintain given strength. For instance, the substrate may be formed of a glass material, a ceramic substrates material based on alumina ($Al_2O_3$), forsterite ($2MgO.SiO_2$), steatite ($MgO.SiO_2$), mullite ($3Al_2O_3.2SiO_2$), beryllia (BeO), aluminum nitride (AlN), silicon nitride (SiN), and silicon carbide (SiC+BeO), and a heat-resistance glass material such as a crystallized glass material. Of these substrates, an alumina substrate and a crystallized glass substrate are particularly preferred. The substrate, when it is required to have thermal conductivity, should preferably be formed of beryllia, aluminum nitride, and silicon carbide.

Besides, quartz substrates, thermally oxidized silicon wafer substrates, and metal substrates based on titanium, stainless, inconel and iron may be used. When an electrically conductive substrate such as a metal substrate is used, it is preferable to form on the substrate a thick film having a built-in electrode.

For the dielectric thick-film material (for the first insulating layer), known dielectric thick-film materials may be used. Preferably in this case, a material having a relatively high dielectric constant should be used.

For instance, materials based on lead titanate, lead niobate, barium titanate, etc. may be used.

The dielectric thick film has a resistivity of $10^8$ Ω·cm or greater, and especially of the order of $10^{10}$ to $10^{18}$ Ω·cm. The dielectric thick film should preferably be formed of a material having a relatively high dielectric constant ε of the order of 100 to 10,000. The dielectric thick film should have a thickness of preferably 5 to 50 μm, and more preferably 10 to 30 μm.

No particular limitation is imposed on how to form the thick-film insulating layer. However, preference is given to a process by which a 10 to 50 μm thick film can be easily obtained, e.g., a sol-gel process and a printing firing process.

When the thick-film insulating layer is formed by the printing firing process, the starting material having a suitable consistent particle size is mixed with a binder to prepare a paste having a suitable viscosity. This paste is formed on a substrate by means of screen printing, and dried to obtain a green sheet. Finally, this green sheet is fired at a suitable temperature to obtain a thick film.

The thin-film insulating layer (the second insulating layer), for instance, may be formed of silicon oxide ($SiO_2$), siliconnitride (SiN), tantalumoxide ($Ta_2O_5$), strontium titanate ($SrTiO_3$), yttrium oxide ($Y_2O_3$), barium titanate ($BaTiO_3$), lead titanate ($PbTiO_3$), PZT, zirconia ($ZrO_2$), silicon oxynitride (SiON), alumina ($Al_2O_3$), lead niobate and PMN-PT base material, and may be in a multilayer thin film or mixed thin film form composed thereof. To form the insulating layer with these materials, existing processes such as evaporation, sputtering, CVD, sol-gel and printing firing processes may be used. Preferably in this case, the insulting layer should have a thickness of 50 to 1,000 nm, and especially about 100 to 500 nm.

The electrode (lower electrode) is formed at least on the substrate side or in the first dielectric material. For the electrode layer which is exposed together with the light emitting layer to high temperature for heat treatment during thick-film formation, an ordinarily used metal electrode may be used, which electrode comprises as a main component one or two or more of palladium, rhodium, iridium, rhenium, ruthenium, platinum, tantalum, nickel, chromium, titanium and the like.

Since the EL device is usually designed in such a way that the emitted light is extracted out of its side facing away from the substrate, it is preferable to use for another electrode providing the upper electrode a transparent electrode transparent to light in a given light emission wavelength range. If the substrate is transparent, then the transparent electrode can be used for the lower electrode because the emitted light can be taken out of the substrate side of the EL device. In this case, it is particularly preferable to use a transparent electrode such as a ZnO or ITO electrode. Usually, ITO contains $In_2O_3$ and SnO in stochiometric composition; however, the amount of O may deviate slightly from this composition. The mixing ratio of $SnO_2$ with respect to $In_2O_3$ should be preferably 1 to 20% by mass, and more preferably 5 to 12% by mass. Regarding IZO, the mixing ratio of ZnO with respect to $In_2O_3$ is usually of the order of 12 to 32% by mass.

The electrode may contain silicon. This silicon electrode layer may be in a polycrystal (p-Si) or amorphous (a-Si) state. If required, the silicon electrode layer should be formed of single crystal silicon.

Comprising silicon as the main component, the electrode should be doped with impurities for the purpose of ensuring electrical conductivity. Since the requirement for the dopant used as the impurities is only to ensure given electrical conductivity, ordinary dopants used for silicon semiconductors may be used to this end. For instance, B, P, As, Sb, Al and the like may be used; however, preference is given to B, P, As, Sb and Al. The concentration of the dopant is preferably of the order of 0.001 to 5 at %.

To form the electrode layer with these materials, existing processes such as evaporation, sputtering, CVD, sol-gel and printing firing processes may be used. Especially when a structure wherein a thick film with a built-in electrode is formed on the substrate, it is preferable to make use of the same process as that used to form the dielectric thick film.

For the efficient application of an electric field to the light emitting layer, the electrode should preferably have a resistivity of 1 Ω·cm or lower, and especially 0.003 to 0.1 Ω·cm. The electrode layer has a thickness of preferably 50 to 2,000 nm, and especially of the order of 100 to 1,000 nm although depending on the material to form the same.

While the application of the light emitting layer of the present invention to the inorganic EL device has been explained, it is appreciated that other devices capable of emitting light in red, blue, and green, to which the invention is applicable, too, may be applied to full-color display panels.

EXAMPLE

The present invention is now explained in further detail with reference to some specific examples.

Example 1

Shown in FIG. 1 is one example of the evaporation system that may be used for the fabrication process of the present invention. Here, two E guns were used in place of a two-point control gun.

The EB source 15 charged with BaS powders with 5 mol % of Eu added thereto and the EB source 14 charged with $Al_2S_3$ powders were positioned in the vacuum chamber 11 with oxygen introduced thereinto. The feed materials were simultaneously evaporated from the respective sources to deposit a thin film on a rotating substrate heated to 400° C. The rate of evaporation of the feed materials from the respective evaporation sources was controlled in such a way that the thin film was formed on the substrate at a deposition rate of 1 nm/sec. In the meantime, 20 SCCM of oxygen gas were introduced into the vacuum chamber. After the thin film had been formed, it was annealed for 10 minutes in a vacuum of 900° C.

An X-ray fluorescence composition analysis of the $Ba_x$-$Al_yO_zS_w$:Eu thin film formed on the Si substrate has shown that the atomic ratio thereof is Ba:Al:O:S:Eu= 7.40:19.18:70.15:2.90:0.36.

Further, an EL device having such structure as shown in FIG. 2 was fabricated using this light emitting layer. The same $BaTiO_3$ dielectric material having a dielectric constant of 5,000 was used for both the substrate and the thick-film insulating layer, and a Pd electrode for the lower electrode. The lower electrode and thick-film insulating layer were screen printed on a substrate sheet to form a green sheet. After co-firing of these parts, the sheet was polished on the surface to obtain a substrate having a thick-film form of first insulating layer of 30 $\mu$m in thickness.

The phosphor thin film (light emitting layer) was formed on the substrate to a thickness of 300 nm as mentioned above.

Furthermore, the second insulating thin-film layer was formed on the phosphor thin film. For the second insulating thin-film layer, $Ta_2O_5$ was formed to a thickness of 200 nm. On the second insulating thin-film layer, an ITO transparent electrode of 200 nm in thickness was formed at a substrate temperature of 250° C. by means of an RF magnetron sputtering process using an ITO oxide target, thereby finishing up the EL device.

Figure 3:
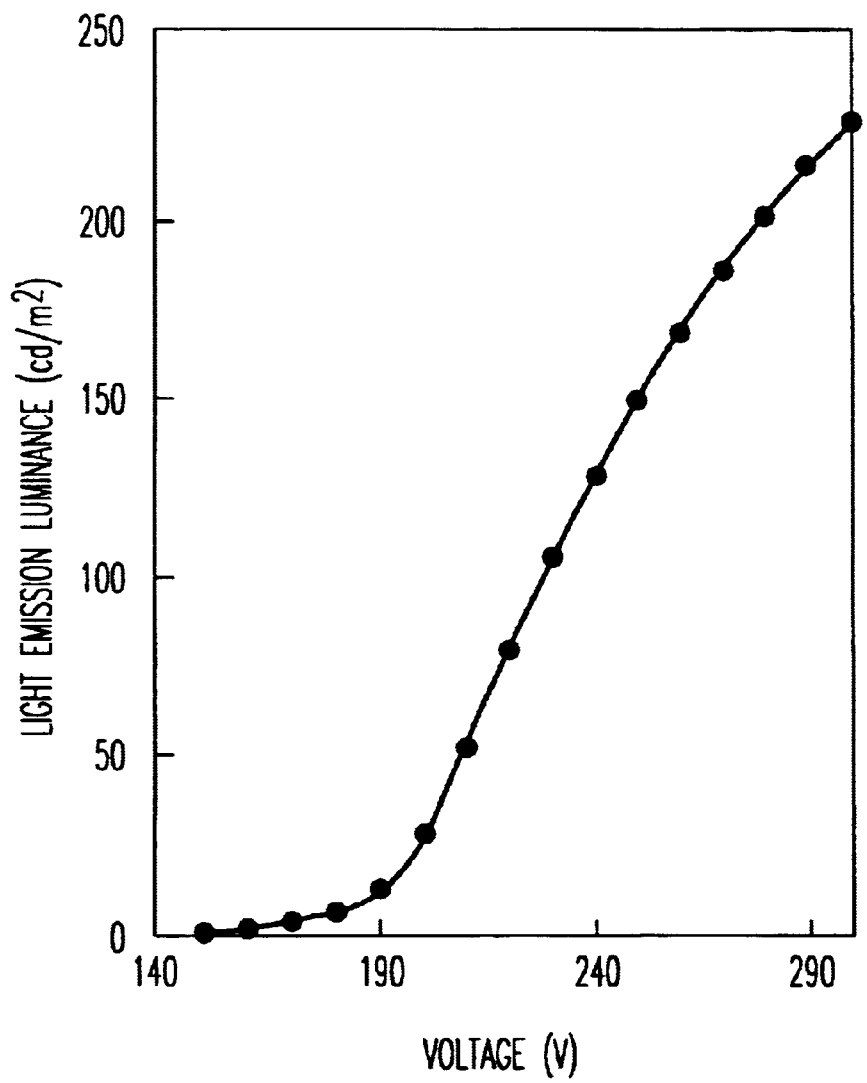
FIG. 3 is a graph showing the luminance vs. voltage characteristics of the EL panel according to Example 1.
Figure 4:
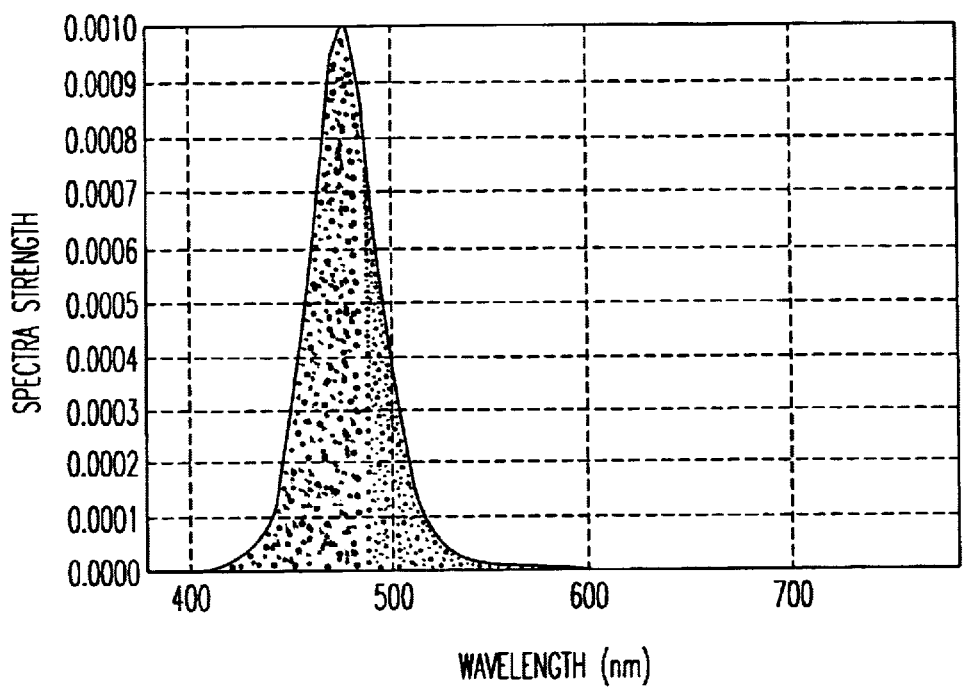
FIG. 4 a graph showing the emission spectra of the EL panel according to Example 1.

An electric field of 1 kHz and 50 $\mu$S in pulse width was applied on the electrode of the obtained EL device. A blue light emission luminance of 200 cd/$M^2$ was obtained with satisfactory reproducibility. The luminance vs. voltage characteristics and the emission spectra are shown in FIGS. 3 and 4, respectively.

Example 2

Example 1 was repeated with the exception that Tb was used in place of the rare earth metal Eu. Much the same results as in Example 1 were obtained. In this example, green light was emitted.

Example 3

Example 1 was repeated with the exception that Sm was used in place of the rare earth metal Eu. Much the same results as in Example 1 were obtained. In this example, red light was emitted.

Example 4

Example 1 was repeated with the exception that one or two or more of Mg, Ca and Sr were used in place of or together with the alkali earth metal Ba. Much the same results as in Example 1 were obtained.

Example 5

In this example, one EB gun and one resistive heating cell were used in place of the example of the evaporation system shown in FIG. 1.

The EB source 15 charged with BaS powders with 5 mol % of Eu added thereto and the resistive heating source 14 charged with $Al_2S_3$ powders were positioned in the vacuum chamber 11 with $H_2S$ introduced thereinto. The feed materials were simultaneously evaporated from the respective sources to deposit a thin film on a rotating substrate heated to 400° C. The rate of evaporation of the feed materials from the respective evaporation sources was controlled in such a way that the thin film was formed on the substrate at a deposition rate of 1 nm/sec. In the meantime, 10 SCCM of $H_2S$ gas were introduced into the vacuum chamber. After the thin film had been formed, it was annealed for 10 minutes in the air of 750° C. to obtain a $Ba_xAl_yO_zS_w$:Eu thin film.

An X-ray fluorescence composition analysis of the $Ba_x$-$Al_yO_zS_w$:Eu thin film formed on the Si substrate has shown that the atomic ratio thereof is Ba:Al:O:S:Eu= 8.27:18.09:65.57:7.83:0.24.

Further, an EL device having such structure as shown in FIG. 2 was fabricated using this light emitting layer. The same $BaTiO_3$ dielectric material having a dielectric constant of 5,000 was used for both the substrate and the thick-film insulating layer, and a Pd electrode for the lower electrode. The lower electrode and thick-film insulating layer were screen printed on a substrate sheet to form a green sheet. After co-firing of these parts, the sheet was polished on the surface to obtain a substrate having a thick-film form of first insulating layer of 30 $\mu$m in thickness.

The phosphor thin film (light emitting layer) was formed on the substrate to a thickness of 300 nm as mentioned above.

Furthermore, the second insulating thin-film layer was formed on the phosphor thin film. For the second insulating thin-film layer, $Ta_2O_5$ was formed to a thickness of 200 nm. On the second insulating thin-film layer, an ITO transparent electrode of 200 nm in thickness was formed at a substrate temperature of 250° C. by means of an RF magnetron sputtering process using an ITO oxide target, thereby finishing up the EL device.

An electric field of 1 kHz and 50 $\mu$S in pulse width was applied on the electrode of the obtained EL device. A blue light emission luminance of 250 cd/$m^2$ was obtained with satisfactory reproducibility.

Example 6

Figure 5:
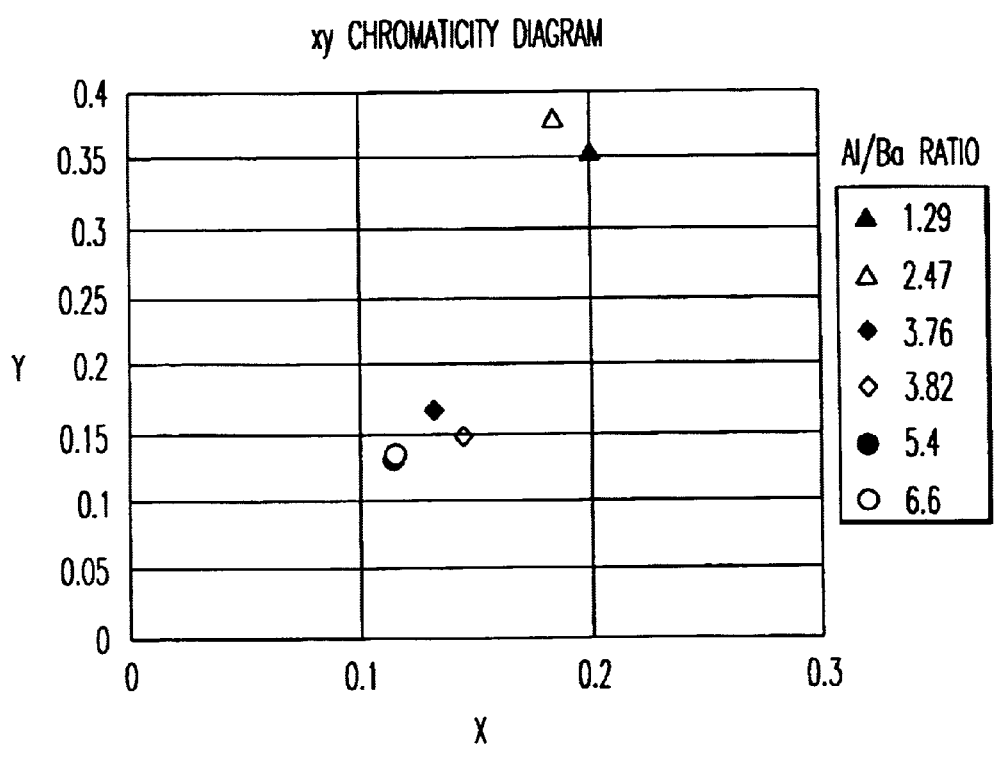
FIG. 5 is a graph showing the Al/Ba ratio vs. chromaticity of blue light emission relations in Example 6, viz., the x vs. y relations.

Phosphor thin films with varying Al/Ba ratios were prepared and driven as in Example 5. The Al/Ba ratio vs. chromaticity of blue light emission relations, viz., the x vs. y relations are shown in FIG. 5. As can be seen from FIG. 5, EL light emission with high blue color purity is obtainable when the Al/Ba ratio is in the range of 3 or greater, and especially 5 to 7.

Example 7

Phosphor thin films with varying amounts of oxygen and sulfur were prepared and driven as in Example 5.

Figure 6:
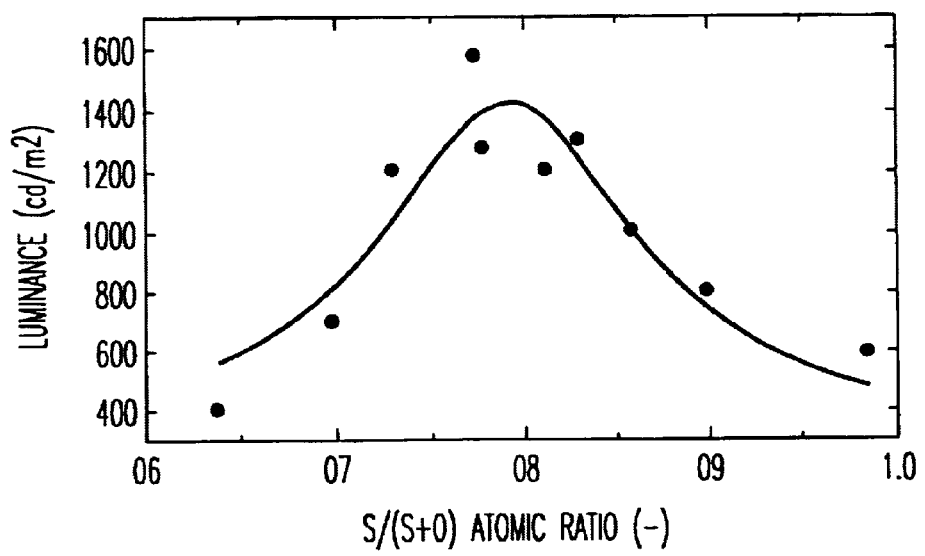
FIG. 6 is a graph showing the oxygen/sulfur content vs. chromaticity of blue light emission relations in Example 7.

FIG. 6 shows the relations between the amount of oxygen-sulfur in the films and the luminance of the devices. As can be seen from FIG. 6, EL light emission with an enhanced blue luminance is obtainable when the S/(O+S) ratio is in the range of 0.7 to 0.9.

The amount of oxygen-sulfur varies with variations in the conditions for annealing temperature, atmosphere and humidity, etc., so that various phosphor thin films can be obtained. After an evaluation of luminance, the composition of each device was analyzed in section by means of EDS (energy-diffraction X-ray spectroscopy and also abbreviated as EDX) to identify the composition ratio for oxygen, S, Al and Ba. The Al/Ba ratio was then found to be 2 to 3.

In terms of device's luminance deterioration, an inventive device with S/(S+O)=0.779 that was within the inventive range was compared with a comparative device with S/(S+O)=0.985 indicative of substantially no containment of oxygen. For an evaluation of the luminance deterioration, an alternating voltage of 6 kHz was applied to each device. The device with S/(S+O)=0.985 showed that the light emission luminance after 40 hours decreases to 15% or less of the initial luminance, whereas the device with S/(S+O)=0.779 showed a very limited luminance deterioration or a 66% drop from the initial luminance. From this, it is found that devices containing suitable amounts of both oxygen and sulfur are much more improved in long lasting qualities and so can be used on a practical level.

With the phosphor thin film of the present invention, it is thus possible to achieve red, green and blue fluorescent thin-film materials without recourse to any filter, which can emit light at higher luminance yet with satisfactory color purity, and achieve high luminance using the same film-forming method or system.

By using a fluorescent matrix material and a luminescent center material that are chemically or physically similar in properties to each other, it is possible to simplify a full-color EL panel production process, thereby providing a phosphor thin film which is less susceptible to luminance variations and can be produced in improved yields and so at lower costs.

EL devices using such a thin film are improved in terms of light emission capabilities and practical utility, because especially when multi-color EL devices or full-color EL devices are fabricated, light emission layers can be fabricated with improved reproducibility.

ADVANTAGES OF THE INVENTION

According to the present invention, it is thus possible to provide a phosphor thin film which can dispense with any filter and has satisfactory color purity, and is particularly well fit for RGB full-color ELs and its fabrication process as well as an EL panel.

It is also possible to simplify a full-color EL panel production process, thereby providing a phosphor thin film which is less susceptible to luminance variations and can be produced in improved yields and so at lower costs and its fabrication process as well as an EL panel.

Whereas the invention has been shown and described in connection with the preferred embodiments thereof, it should be understood that many modifications, substitutions and additions may be made which are within the intended scope of the appended claims.

What we claim is:

1. A phosphor thin film, comprising a matrix material comprising as a main component an alkaline earth aluminate that is an oxide and comprises sulfur, and further comprising an element that provides a luminescent center, wherein the compound has a chemical structure represented by $A_xAl_yO_zS_w$:Re, wherein Re is a rare earth element, A is at least one element selected from the group consisting of Mg, Ca, Sr, and Ba, x=1 to 5, y=1 to 15, z=3 to 30, and w=3 to 30.

2. The phosphor thin film according to claim 1, wherein the molar ratio, S/(S+O), of the sulfur element contained therein with respect to an oxygen atom in said matrix material is in the range of 0.01 to 0.5.

3. The phosphor thin film according to claim 1, wherein Re is at least one member selected from the group consisting of Eu, Tb and Sm.

4. An electroluminescent panel comprising a phosphor thin film as recited in claim 1.

5. A phosphor thin film, comprising a matrix material comprising, as a main component, an alkaline earth aluminate that is an oxide and comprises sulfur, and further comprising an element that provides a luminescent center, wherein the compound has a chemical structure represented by $A_xAl_yO_zS_w$:Re, wherein Re is a rare earth element, A is at least one element selected from the group consisting of Mg, Ca, Sr, and Ba, x=1 to 5, y=1 to 15, and w=3 to 30 and S/(S+O) ranges from 0.7 to 0.95.

6. The phosphor thin film according to claim 5, wherein $1.5 \leq y/x \leq 3.0$.

7. The phosphor thin film according to claim 6, wherein S/(S+O)=0.7 to 0.9.

8. A phosphor thin film represented by $A_xAl_yO_zS_w$:Re where Re is a rare earth element, A is at least one element selected from Mg, Ca, Sr and Ba, x=1 to 5, y=1 to 15, z=3 to 30, and w=3 to 30 provided that $5 \leq y/x \leq 7$.

9. A phosphor thin film, comprising a matrix material comprising as a main component an alkaline earth aluminate that is an oxide and comprising sulfur, and further comprising an element that provides a luminescent center wherein S/(S+O) ranges from 0.7 to 0.95.

10. A phosphor thin film fabrication process comprising steps of:

forming a sulfide thin film containing sulfur and a luminescent center for a matrix material precursor, and annealing the sulfide thin film in an oxidizing atmosphere to introduce oxygen therein, thereby obtaining a phosphor thin film as recited in claim 1.

11. A process for fabricating a phosphor thin film as recited in claim 1 by an evaporation process, which comprises steps of:

introducing an oxygen gas in a vacuum chamber in which, at least, an aluminum sulfide evaporation source and an alkali earth sulfide evaporation source with a luminescent center added thereto are disposed, and evaporating aluminum sulfide and an alkali earth sulfide material from the respective evaporation sources to combine the respective feed materials with the oxygen gas during the deposition thereof on a substrate, thereby obtaining said phosphor thin film.

12. A process for fabricating a phosphor thin film as recited in claim 1 by an evaporation process, which comprises steps of:

introducing a hydrogen sulfide gas in a vacuum chamber in which, at least, an aluminum sulfide evaporation source and an alkali earth sulfide evaporation source with a luminescent center added thereto are disposed, evaporating aluminum sulfide and an alkali earth sulfide material from the respective evaporation sources, combining the respective feed materials with the hydrogen sulfide gas during the deposition thereof on a substrate, thereby obtaining a sulfide phosphor thin film, and annealing the sulfide phosphor thin film in an oxidizing atmosphere.

* * * * *

UNITED STATES PATENT AND TRADEMARK OFFICE
CERTIFICATE OF CORRECTION

PATENT NO. : 6,614,173 B2 Page 1 of 1
DATED : September 2, 2003
INVENTOR(S) : Yano et al.

It is certified that error appears in the above-identified patent and that said Letters Patent is hereby corrected as shown below:

<u>Title page,</u>
Item [54], Title, should read:
-- [54] PHOSPHOR THIN FILM, ITS FABRICATION PROCESS AND EL PANEL --
Item [45] and Item [*] Notice should read:
-- [45] **Date of Patent: *Sep. 2, 2003**

[*] Notice: Subject to any disclaimer, the term of this patent is extended or adjusted under 35 U.S.C. 154(b) by 71 days.

This Patent is subject to a Terminal Disclaimer. --

Signed and Sealed this

Twenty-seventh Day of July, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,614,173 B2  
DATED        : September 2, 2003  
INVENTOR(S)  : Yano et al.

Page 1 of 1

It is certified that error appears in the above-identified patent and that said Letters Patent is hereby corrected as shown below:

<u>Title page, Item [54] and Column 1, line 1,</u>  
Title, should read:  
-- [54] PHOSPHOR THIN FILM, ITS FABRICATION PROCESS AND EL PANEL --  
Item [45] and Item [*] Notice should read:  
-- [45] **Date of Patent:  *Sep. 2, 2003**

[*]   Notice: Subject to any disclaimer, the term of this patent is extended or adjusted under 35 U.S.C. 154(b) by 71 days.

This Patent is subject to a Terminal Disclaimer. --

This certificate supersedes Certificate of Correction issued July 27, 2004.

Signed and Sealed this

Fourteenth Day of September, 2004

JON W. DUDAS  
*Director of the United States Patent and Trademark Office*

UNITED STATES PATENT AND TRADEMARK OFFICE
CERTIFICATE OF CORRECTION

PATENT NO. : 6,614,173 B2
DATED : September 2, 2003
INVENTOR(S) : Yano et al.

It is certified that error appears in the above-identified patent and that said Letters Patent is hereby corrected as shown below:

<u>Title page,</u>
Item [75], Inventors, should read:
-- [75] Inventors: Yoshihiko Yano, Tokyo (JP);
                       Tomoyuki Oike, Tokyo (JP) --

Signed and Sealed this

Fifteenth Day of February, 2005

JON W. DUDAS
*Director of the United States Patent and Trademark Office*